(12) United States Patent
Misaki et al.

(10) Patent No.: US 7,503,609 B2
(45) Date of Patent: Mar. 17, 2009

(54) STORAGE BOX STRUCTURE

(75) Inventors: Kenichi Misaki, Saitama (JP); Ikuo Hara, Saitama (JP); Yoshihiro Inoue, Saitama (JP); Masayuki Dazai, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 426 days.

(21) Appl. No.: 11/392,716

(22) Filed: Mar. 30, 2006

(65) Prior Publication Data

US 2006/0220407 A1 Oct. 5, 2006

(30) Foreign Application Priority Data

Mar. 31, 2005 (JP) ............... 2005-103845

(51) Int. Cl.
*B60R 5/04* (2006.01)
(52) U.S. Cl. .................................... 296/37.1
(58) Field of Classification Search ............... 296/37.1, 296/24.3; 180/219; 224/413, 427
See application file for complete search history.

(56) References Cited

U.S. PATENT DOCUMENTS

| | | | |
|---|---|---|---|
| 5,040,632 A | * | 8/1991 | Fujii et al. .................. 180/219 |
| 5,044,646 A | * | 9/1991 | Iiga et al. ..................... 180/219 |
| 2008/0156561 A1 | * | 7/2008 | Yano et al. .................. 180/219 |
| 2008/0156562 A1 | * | 7/2008 | Yano et al. .................. 180/219 |
| 2008/0169134 A1 | * | 7/2008 | Tomolillo et al. .......... 180/6.24 |

FOREIGN PATENT DOCUMENTS

JP 2001-287678 A 10/2001

* cited by examiner

*Primary Examiner*—H Gutman
(74) *Attorney, Agent, or Firm*—Birch, Stewart, Kolasch & Birch, LLP

(57) ABSTRACT

A storage box structure includes a pair of left and right seat cowls for covering sides of a vehicle body frame under a seat. Storage boxes are formed by the seat cowls so as to protrude outwardly in the direction of the vehicle width and provided with openable and closable lids on the outsides of a vehicle. The storage boxes include a projection projecting toward the center of the vehicle body. The projection includes an opening which is in communication with the interior of the storage box and is fitted at least to the projection of the other storage box. The opening brings the interiors of the left and right storage boxes into communication with each other. The storage box structure so configured achieves a reduction of the number of components, improvement of rigidity, and improvement of mounting accuracy.

20 Claims, 8 Drawing Sheets

STORAGE BOX STRUCTURE

CROSS-REFERENCE TO RELATED APPLICATION

The present application claims priority under 35 U.S.C. §119 to Japanese Patent Application No. 2005-103845, filed Mar. 31, 2005, the entire contents of which are hereby incorporated by reference.

BACKGROUND OF THE INVENTION

1. Field of the Invention

The present invention relates to a storage box structure used for storing objects inside a vehicle body of, for example, a motorcycle.

2. Description of Background Art

For example, in a scooter-type vehicle, a storage box structure including a storage box under a seat and a side storage box on the side of a vehicle body in communication with each other for storing a long object is known. In the storage box structure in this arrangement, an object storage chamber in a shape of a bottomed container is provided in a rear body under a sitting seat, and side storage chambers provided on both left and right sides of the rear body integrally with respect each other so as to protrude outwardly of in the direction of the width of the vehicle, and the three storage chambers including the side storage chambers and the object storage chamber are in communication with each other via a communicating section. (For example, see JP-A-2001-287678.)

However, in JP-A-2001-287678 described above, since the communicating section for bringing the respective side storage chambers and the object storage chamber into communication is a separate part from the respective storage chambers, the number of components may increase. Since the left and right storage chambers are not substantially connected, the respective storage chambers need to secure rigidity individually, upper and lower positions of the left and right storage chambers need to be aligned during assembling work.

SUMMARY AND OBJECTS OF THE INVENTION

It is an object of the present invention to solve the above described problems and to provide a storage box structure which can achieve the reduction of the number of components, improved rigidity, and improved mounting accuracy.

According to a first aspect of the present invention, a storage box structure including: a pair of left and right seat cowls for covering sides of a vehicle body frame under a seat, storage boxes formed by the seat cowls so as to protrude outwardly in the direction of the vehicle width and provided with openable and closable lids on the outsides of a vehicle, characterized in that the storage boxes each includes a projection projecting toward the center of a vehicle body, the projection includes an openings which are in communication with an interior of the storage box and is fitted at least to the projection of the other storage box, and the openings bring the interiors of the left and right storage boxes into communication with each other.

According to a second aspect of the present invention, the projection is arranged on a rear portion of the storage box.

According to a third aspect of the present invention, one of the projections is provided with a concave portion, and the other projection is provided with a convex portion, so that the concave portion and the convex portion are fitted to each other.

According to a fourth aspect of the present invention, one of the projections is provided with a claw and the other projection is provided with a claw engaging portion, whereby engagement is achieved by fitting between the concave portion and the convex portion.

According a fifth aspect of the present invention, the claw and the claw engaging portion are provided on an upper portion of the respective projections, and lower portions of the respective projections are tightened by a tightening member.

According to the first aspect of the present invention, since the left and right storage boxes are combined in communication with each other by the projections provided on the storage boxes, an additional member for bringing those into communication is not necessary as in the case of the related art, and hence the number of components can be reduced. By combining the left and right storage boxes integrally, rigidity of the left and right separate seat cowls whereby the storage boxes are defined can be increased. In addition, since the vertical and lateral position of the left and right storage boxes can easily be aligned with each other, working efficiency in mounting the peripheral components can be improved without affecting the mounting accuracy of the peripheral components.

According to the second aspect of the present invention, since rigidity is improved by the projections which combine the left and right storage boxes at the rear portion of the storage box, and hence relatively heavy vehicle body components can be mounted directly to the storage boxes, an auxiliary member such as a stay for the vehicle body component can be eliminated and hence reduction of the number of components and restraint in increase in weight can be achieved. In addition, since the rigidity of the rear portion of the storage box is high because of connection, and hence points of attachment to the vehicle body frame may only be a front portion and an upper portion. Therefore, it is not necessary to provide the auxiliary member such as a stay for mounting the rear portion so as to extend therefrom, and hence reduction of the number of components and restraint of increase in weight can be achieved in the same manner. Since the projection is arranged so as to follow an upper portion of a rear fender which extends rearward and downward, increase in height of the vehicle body and increase in length of the vehicle body in the fore-and-aft direction are prevented, whereby design can be improved.

According to the third aspect of the present invention, the number of positions on the left and right storage boxes where the tightening members are used can further be reduced, and hence reduction of the number of components and restraint of increase in weight can be achieved.

According to the fourth aspect of the present invention, the number of the positions on the left and right storage boxes where the tightening members are used can be reduced, and hence reduction of the number of components and restraint of increase in weight can further be achieved.

According to the fifth aspect of the present invention, by using the tightening members on the lower portion where a load of the components is exerted intensively when the vehicle components which are heavy structures are arranged in the upper portion of the projection, the left and right storage boxes can be combined firmly while reducing the number of positions where the tightening members are used.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
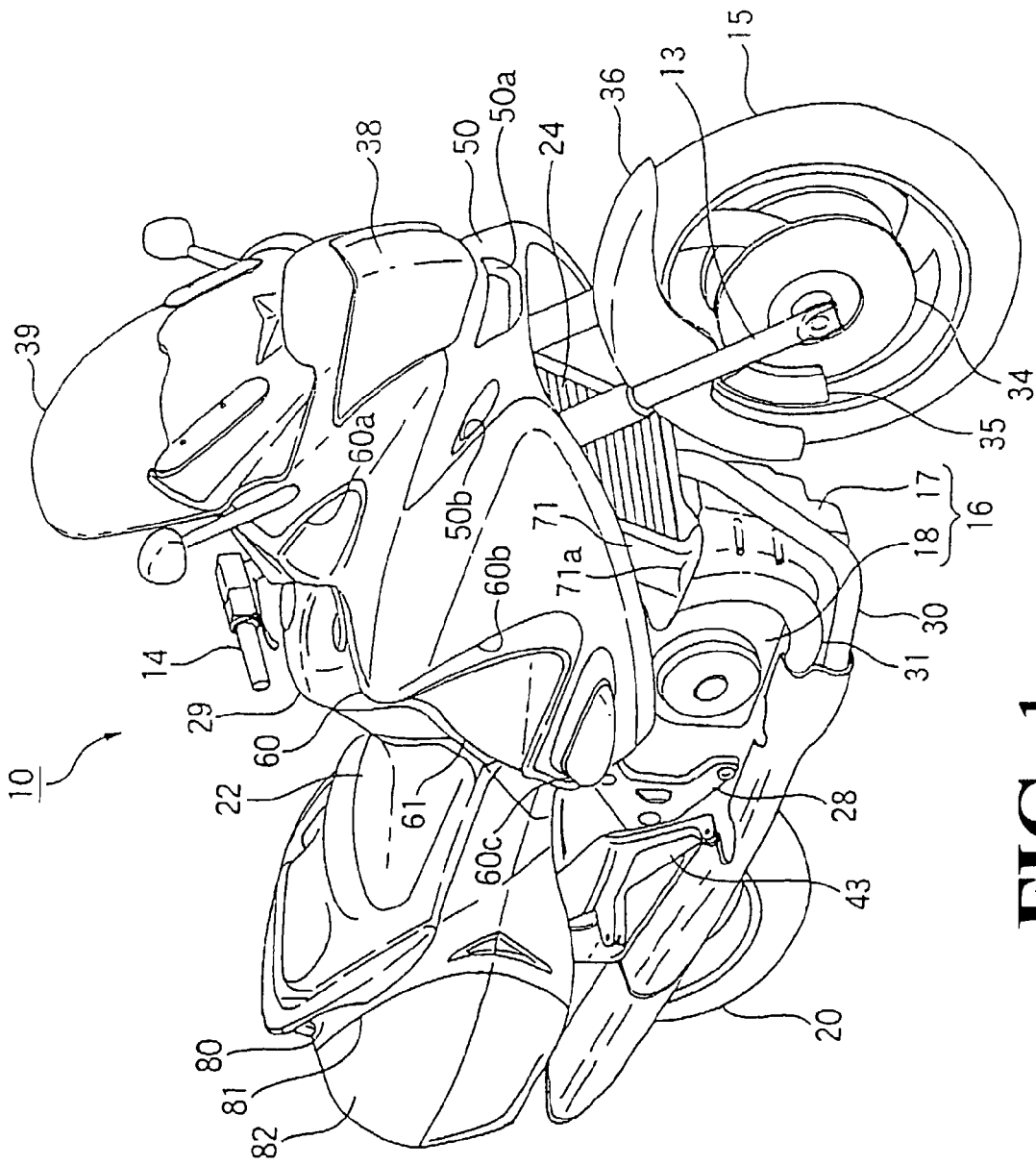
FIG. 1 is an appearance perspective view of a motorcycle having a storage box structure according to the present invention mounted thereon when viewed obliquely from a front side.
Figure 2:
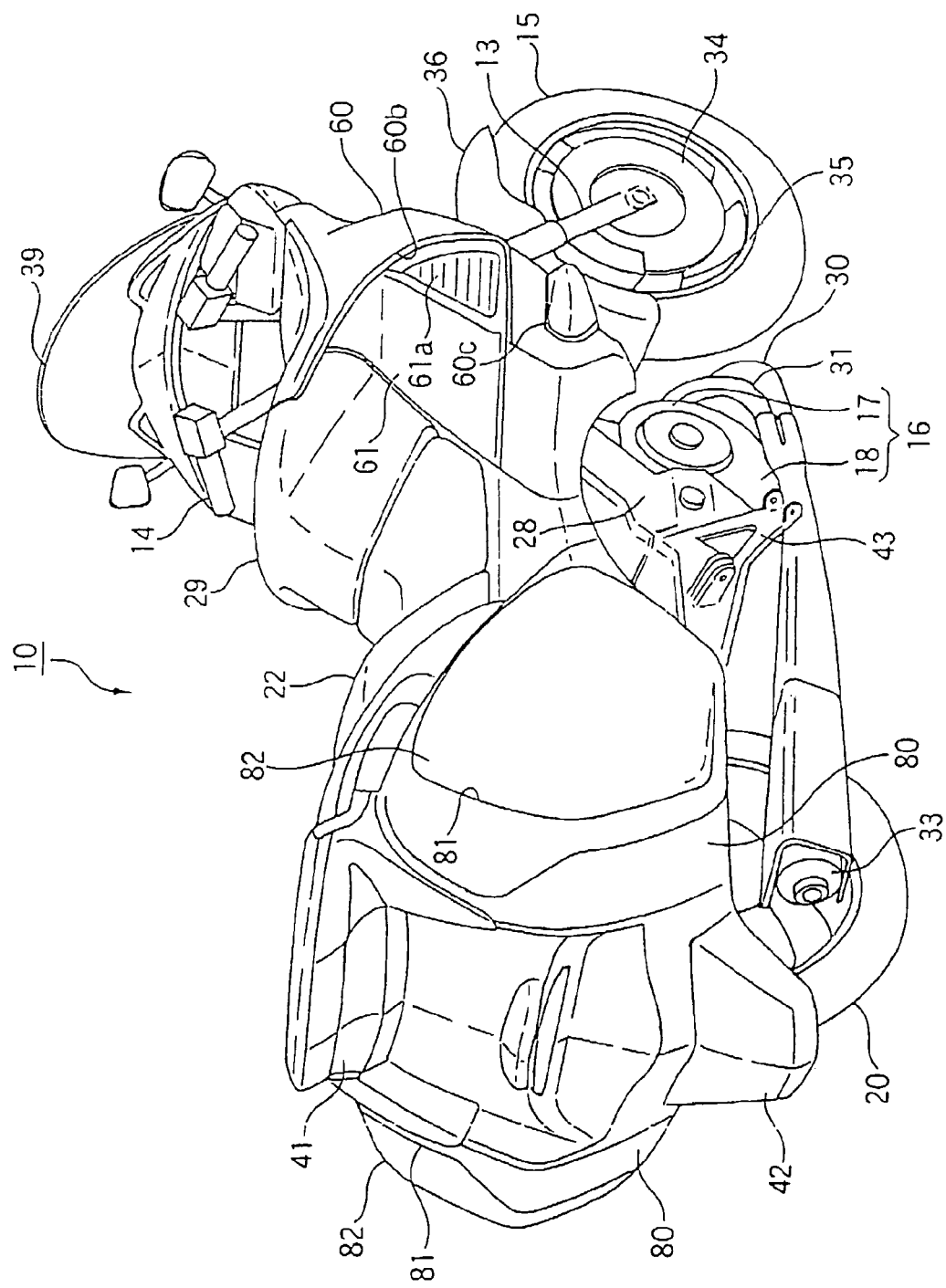
FIG. 2 is an appearance perspective view of the motorcycle shown in FIG. 1 when viewed obliquely from a back side.
Figure 3:
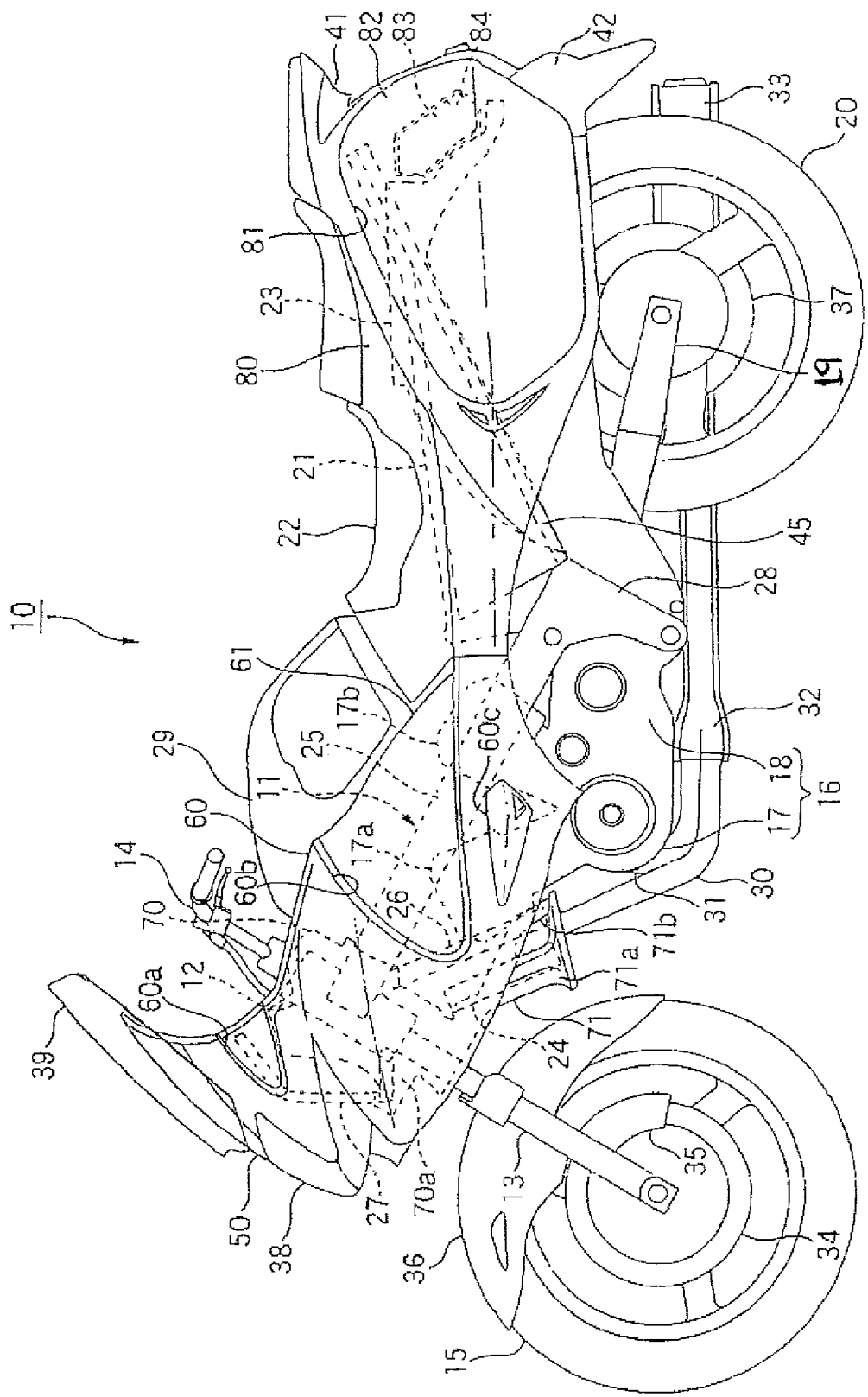
FIG. 3 is a left side view of the motorcycle shown in FIG. 1.

As shown in FIG. 1 to FIG. 3, a motorcycle 10 mainly includes a frame 11, a front fork 13 mounted to a head pipe 12 provided at a front end of the frame 11, a handle 14 connected to an upper portion of the front fork 13, a front wheel 15 mounted to a lower portion of the front fork 13, a power unit 16 including an engine 17 and a transmission 18 mounted to a front lower portion of the frame 11, a swing arm 19 mounted to a lower rear portion of the frame 11, a rear wheel 20 mounted to the swing arm 19, a tandem seat 22 mounted to an upper rear portion of the frame 11 via a seat rail 21, and a rear fender 23 mounted to a position downwardly of the seat rail 21, and the rear wheel 20 is driven by the power unit 16.

The motorcycle 10 includes a radiator 24 on the lower front portion of the frame 11, and also includes a front center cowl 50 for covering the front portion of a vehicle body, and left and right outer cowls 60, 60 having left and right middle cowls 61, 61 for covering both sides of the front portion of the vehicle body. The motorcycle 10 also includes left and right inner cowls 70, 70 having a radiator cover 71 for enclosing around the radiator 24 integrally therewith and being mounted insides of the left and right outer cowls 60, 60, and left and right seat cowls 80, 80 having left and right storage boxes 81, 81 with lids 82, 82 assembled thereto so as to be capable of being opened and closed and covering both sides of the rear portion of the vehicle body. The front center cowl 50, the left and right outer cowls 60, 60, the left and right inner cowls 70, 70, and the left and right seat cowls 80, 80 are formed of light-weight synthetic resin such as Fiber Reinforced Plastic (FRP).

The frame 11 is formed, for example, of aluminum alloy cast into a substantially U-shape, and includes main frame 25 extending rearward and downward in a left and right pair, and the cylindrical head pipe 12 at a front end portion of the main frame 25. The frame 11 also includes a down tube 26 connected to the front end portion of the main frame 25 and extending rearward and downward toward the rear side of the head pipe 12, a front bracket 27 extending upward in front of the head pipe 12 in a substantially L-shape, and a pivot plate 28 arranged at the lower rear end portion of the main frame 25 and connected to the front end portion of the seat rail 21 extending rearward and upward.

The power unit 16 includes the engine 17 of a water-cooled four-stroke V-type having the transmission 18 integrally built therein, and is supported by the main frame 25, the pivot plate 28 and the down tube 26. A fuel tank 29 is mounted on an air cleaner (not shown) upwardly of the power unit 16. A carburetor (not shown) is connected to air inlet ports of a front cylinder side cylinder head 17a and a rear cylinder side cylinder head 17b of the engine 17, an exhaust pipe 30 of the front cylinder side cylinder head 17a and an exhaust pipe 31 of the rear cylinder side cylinder head 17b are connected to a collecting pipe 32 below the engine 17, and the collecting pipe 32 is connected to a muffler 33. The output of the transmission 18 is derived to the side and then is transmitted to a sprocket (not shown) fixed to the rear wheel 20 via a chain (not shown).

The front fork 13 includes a front shock absorber (not shown) having a coil spring and a damper integrated therein, a caliper 35 which provides a braking force to a pair of disk rotors 34 fixed to the front wheel 15 assembled thereto, and a front fender 36 for covering the upper portion of the front wheel 15.

The swing arm 19 is swingably supported by the pivot plate 28, and is damped by a rear shock absorber (not shown) made up of a coil spring and a damper arranged at a position between the swing arm 19 and the frame 11. The rear wheel 20 is provided with disk rotors 37 and a caliper (not shown) in the same manner as the front wheel 15.

The radiator 24 is secured by a bolt to the down tube 26 rearwardly of the front wheel 15 and forwardly of the front cylinder side cylinder head 17a of the engine 17, and is covered by the radiator cover 71 formed downwardly of the left and right inner cowls 70, 70 around the side portions thereof.

The front center cowl 50 includes a headlight unit 38 mounted to a distal end of the front surface, a center air inlet 50a provided downwardly of the headlight unit 38, and side air inlets SOb, 50b provided on both sides of the center air inlet 50a in bi-lateral symmetry.

The front center cowl 50 is provided so as to be interposed between the left and right outer cowls 60, 60 on the front end thereof, and is secured to the front bracket 27 with a bolt. Since the center air inlet 50a is disposed at the center of the front end portion upwardly of the front wheel 15, air from the front is introduced and supplied to the air cleaner during travel. The side air inlets 50b, 50b are arranged upwardly of the front wheel 15 on both sides of the front end portion, part of traveling wind is introduced and distributed toward the left and right middle cowls 61, 61 during travel.

A wind screen 39 is fixed upwardly of the front center cowl 50, and a meter unit (not shown) fixed to the front bracket 27 is arranged inside the front center cowl 50. The front center cowl 50 serves to improve steering stability by receiving traveling wind from the front during travel and providing a downward force to the front wheel 15 by being combined with the left and right outer cowls 60, 60.

Since the left and right outer cowls 60, 60 are formed in bi-lateral symmetry, only the left outer cowl 60 will be described here. The outer cowl 60 covers the side portion of the head pipe 12, the front side portion of the main frame 25, and the side portions of the both cylinder heads 17a, 17b of the engine 17.

The outer cowl 60 includes a cutout 60a for a side binker arranged on the upper portion of the front end, a cutout 60b for the middle cowl, and a projection 60c arranged downwardly of the middle cowl 61.

A side winker 40 secured to the front bracket 27 with a bolt is assembled to the cutout 60a for the side winker.

The middle cowl 61 secured to the main frame 25 with a bolt is attached to the cutout 60b for the middle cowl. Since the middle cowl 61 is provided with a slit shaped opening 61a directed toward the side air inlet 50b of the front center cowl 50, traveling wind introduced from the both side air inlets 50b is discharged from the opening 61a, and flows rearward along the side surface of the vehicle body.

The projection 60c is formed into a wing shape from the front toward the rear in an inverted triangle shape when viewed from the side of the vehicle body, and is protruded outwardly of the vehicle body at a position rearwardly of the radiator 24. An upper surface which defines the upper portion of the projection 60c is arranged substantially horizontally, and a lower surface which defines the lower front portion is arranged to extend rearward and downward Since the left and right inner cowls 70, 70 are formed in bi-lateral symmetry, only the left inner cowl 70 will be described here. The inner cowl 70 has a function to achieve improvement of rigidity and reduction of the weight of the entire cowl by being formed integrally in the outer cowl 60 via a hollow portion.

The inner cowl 70 includes a shell portion 70a which is not exposed outward, and the radiator cover 71. The shell portion 70a is arranged on the upper side, and is secured to the main frame 25 and the head pipe 12 with bolts. The radiator cover 71 disposed on the lower side is fixed to the down tube 26 together with the radiator 24 with bolts.

The radiator cover 71 is formed into a shape which covers the radiator 24 from the side surface to the lower end thereof, and has a protruded portion 71a at the lower end portion. The protruded portion 71a protrudes in a shape of a half droplet from the front toward the rear at a lower end portion of the radiator cover 71 projecting downwardly from the outer cowl 60, and is formed into a shape extending rearward and obliquely upward when viewed from the side of the vehicle. The radiator cover 71 has an opening 71b on the rear portion thereof.

The left and right seat cowls 80, 80 are formed so as to extend across the rear fender 23 in bi-lateral symmetry, and the tandem seat 22 is mounted to the upper portion thereof, and a rear combination lamp 41 and a mud guard 42 are mounted to the rear portion thereof. The left and right seat cowls 80, 80 include the storage boxes 81, 81 formed on the rear portions so as to protrude outwardly in the direction of the vehicle width and provided with the lids 82, 82 on the outer sides of the vehicle so as to be capable of being opened and closed.

Referring now to FIG. 4 to FIG. 8, the left and right seat cowls 80, 80 will be described in detail.

A first characteristic of the left and right seat cowls 80, 80 having the left and right storage boxes 81, 81 is that projections 83, 83 projecting toward the center of the vehicle body are provided, and the projections 83, 83 have openings 84, 84 which communicate with the interior of the left and right storage boxes 81, 81, and the openings 84, 84 come into communication with the interiors of the left and right storage boxes 81, 81 by being fitted to the projections 83, 83 of the left and right storage boxes 81, 81.

A second characteristic of the left and right seat cowls 80, 80 is that the projections 83, 83 are arranged on the rear portion of the left and right storage boxes 81, 81.

Figure 4:
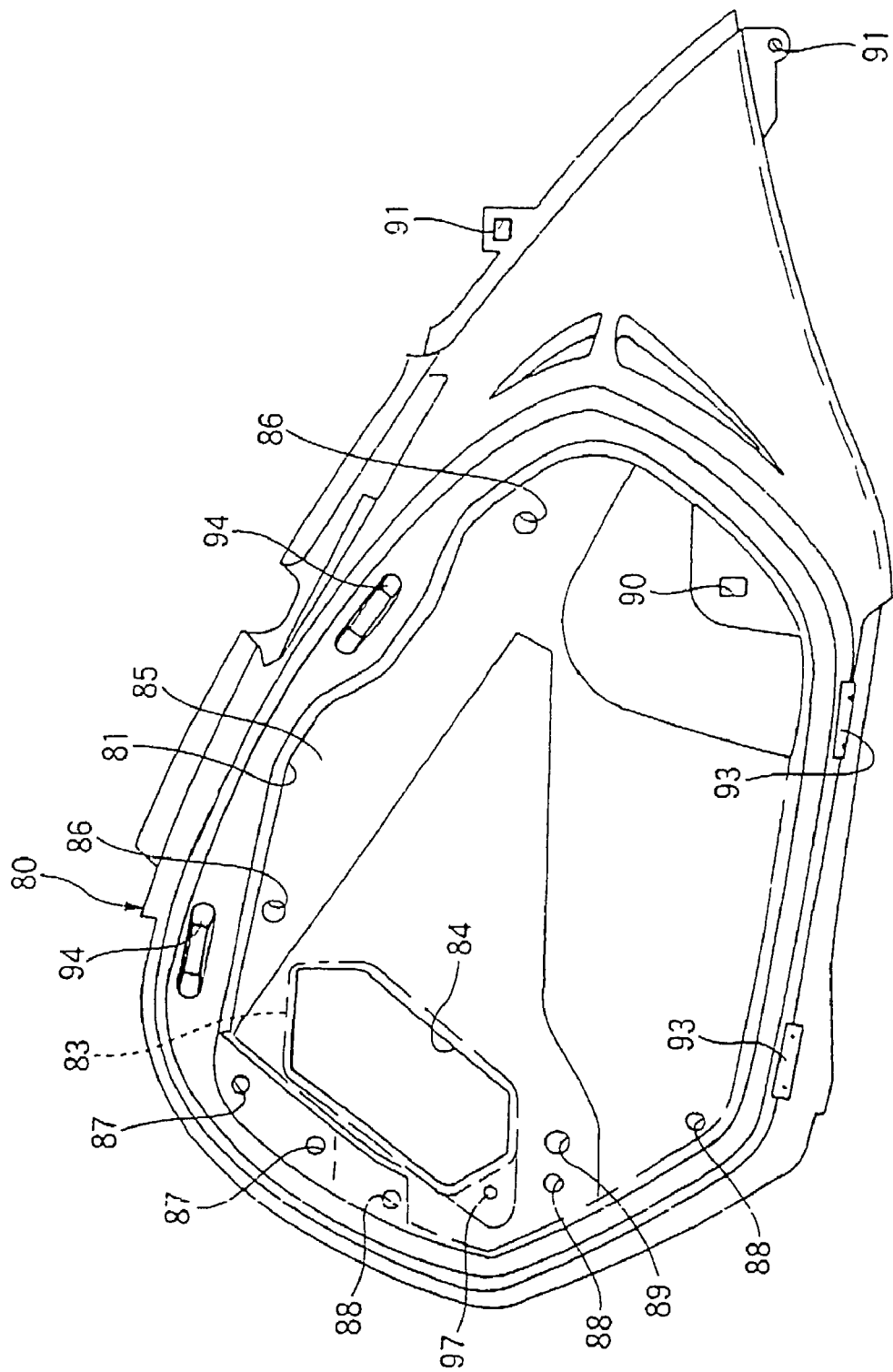
FIG. 4 is a side view of a single unit of a right seat cowl used for the motorcycle shown in FIG. 1.

As shown in FIG. 4, the right seat cowl 80 is formed so that the right storage box 81 protrudes outward in the direction of the vehicle width. Then, a side plate 85 of the right storage box 81 on the side of the center of the vehicle body is formed with bolt holes 86, 86 used for attachment with respect to the seat rail 21 (see FIG. 3), bolt holes 87, 87 for attaching the rear combination lamp 41, bolt holes 88, 88, 88 for attaching the mud guard 42, a bolt hole 89 used for attachment with respect to the rear fender 23, and a bolt hole 90 used for attachment with respect to a step holder 43 (see FIG. 1) provided rearwardly of the pivot plate 28. Also, bolt holes 91, 91 used for attachment with respect to a sub frame 45 side are provided on the outside. At the lower portion of the opening of the right storage box 81, there are formed mounting portions 93, 93 for hinges 92, 92 (see FIG. 7) for opening and closing the lid 82 which is opened from the upper side, and at the upper portion of the opening thereof, there are provided with catchers 94, 94 for locking the lid 82.

The projection 83 formed into a substantially hexagonal column shape is provided on the rear side of the right storage box 81 so as to extend from the side plate 85 toward the center position of the vehicle body, and is provided with a right seat cowl side fitting portion 95 (see FIG. 7 and FIG. 8), which is a concave portion formed into an annular depression at the distal end of the projection, and a claw engaging portion 96 on the upper portion thereof. Since the projection 83 is formed into a cylindrical shape, it has the opening 84 which is predetermined and relatively large in inner diameter on the inside thereof. Since relatively heavy vehicle body components such as the combination lamp 41 and the like are arranged on the upper portion of the projection 83, the connecting strength of the lower portion on which a force is apt to be exerted intensively may be increased by tightening a bolt 100 which is the tightening member for connection on the lower side.

Figure 5:
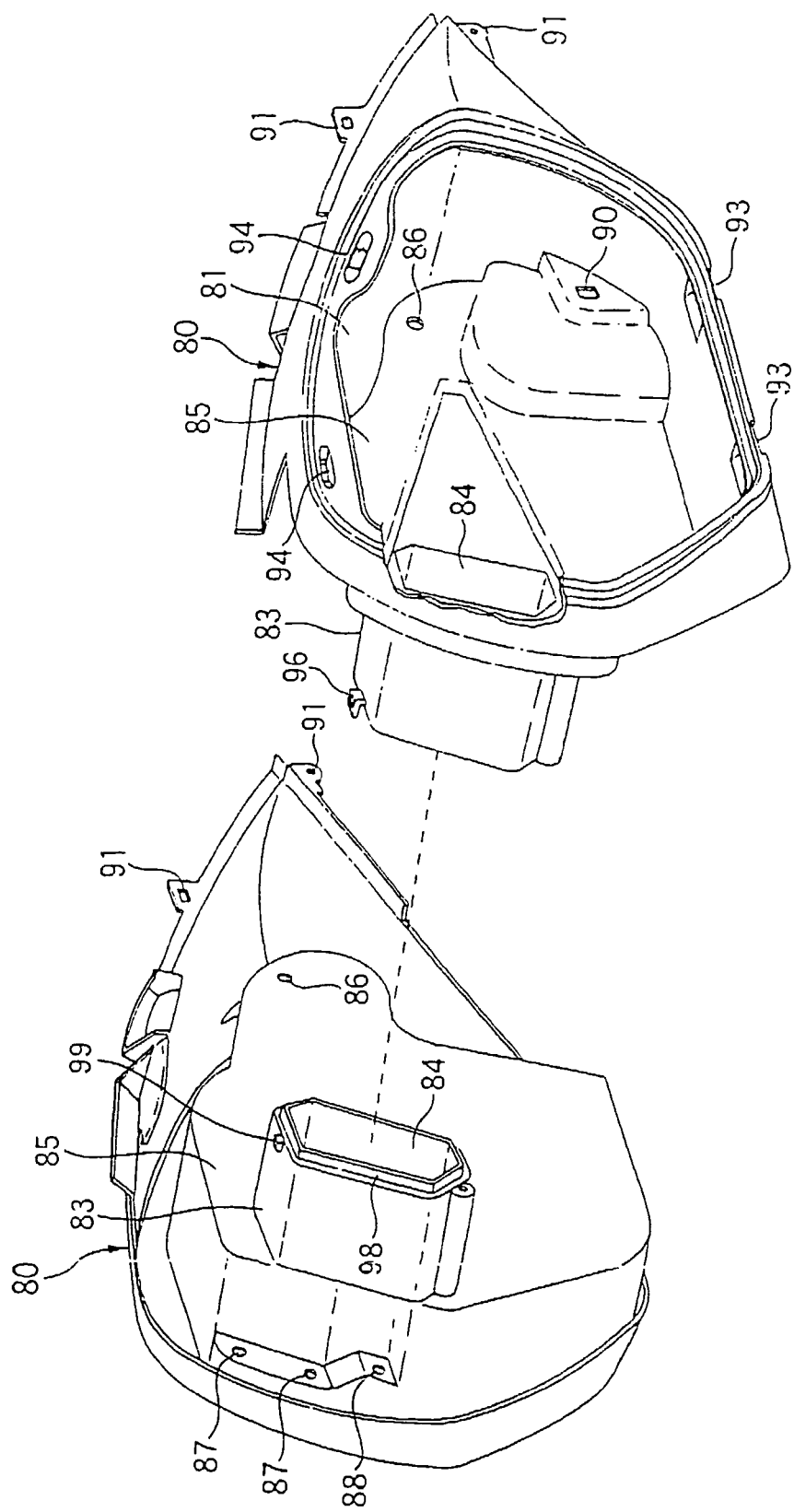
FIG. 5 is an explanatory exploded perspective view showing an assembly procedure of left and right seat cowls used for the motorcycle shown in FIG. 1.

As shown in FIG. 5, since the left seat cowl 80 is formed to be symmetry with the right seat cowl 80, overlapped descriptions will be omitted. The projection 83 formed so as to extend from the side plate 85 to the center position of the vehicle body is provided on the rear side of the left storage box 81, and is provided with a left seat cowl side fitting portion 98 (see FIG. 7 and FIG. 8), which is a projection formed into an annular convex portion shape at the distal end of the projection 83, and a claw 99 to be engaged with the claw engaging portion 96 of the right seat cowl 80 on the upper portion thereof.

In this embodiment, the projection 83 of the left storage box 81 is formed with the convex portion shaped fitting portion 98 and the claw 99, and the projection 83 of the right storage box 81 is formed with the recessed fitting portion 95 and the claw engaging portion 96. However, the positions to provide the fitting portion 95 and the fitting portion 98, and the claw engaging portion 96 and the claw 99 may be reversed.

When assembling the right seat cowl 80 and the left seat cowl 80, the claw engaging portion 96 is engaged with the claw 99 while aligning the concave portion and projection of the left and right seat cowl side fitting portions 95, 98 of the both projections 83, 83. Since the connecting force between both fitting portions 95, 98 increases by the claw 99 engaged with the claw engaging portion 96, the positions to use the tightening members may be reduced to achieve reduction of the number of components and restraint of increase in weight. The detailed assembling procedure of the parts is such that the rear combination lamp 41 and the mud guard 42 are assembled to one of the seat cowls 80, and then the rear fender 23 is assembled, and then the other seat cowl 80 is connected. Accordingly, since it is not necessary to work while supporting the left and right seat cowls 80, 80, workability is dramatically improved.

Figure 6:
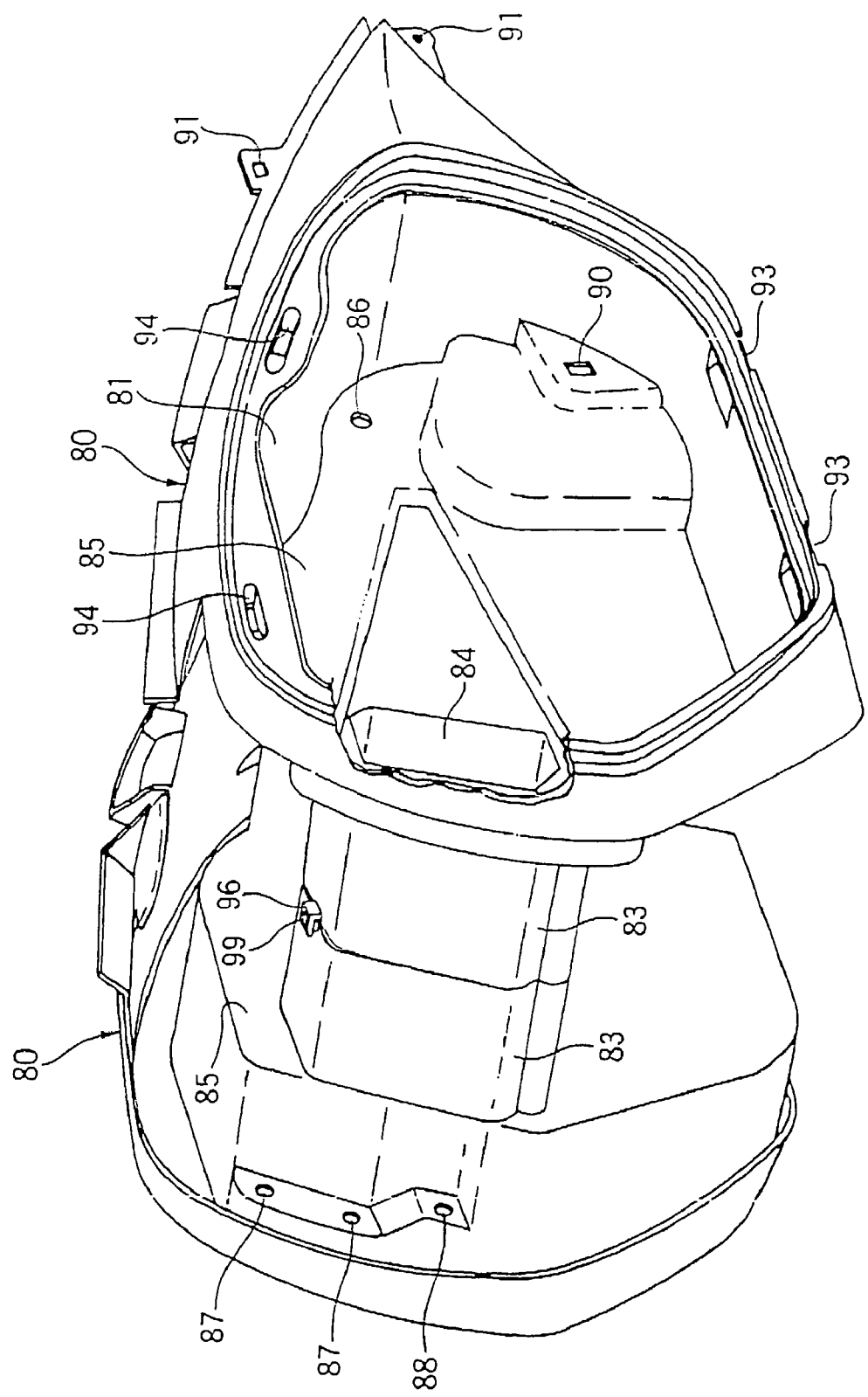
FIG. 6 is an appearance perspective view showing an assembled state in FIG. 5.
Figure 7:
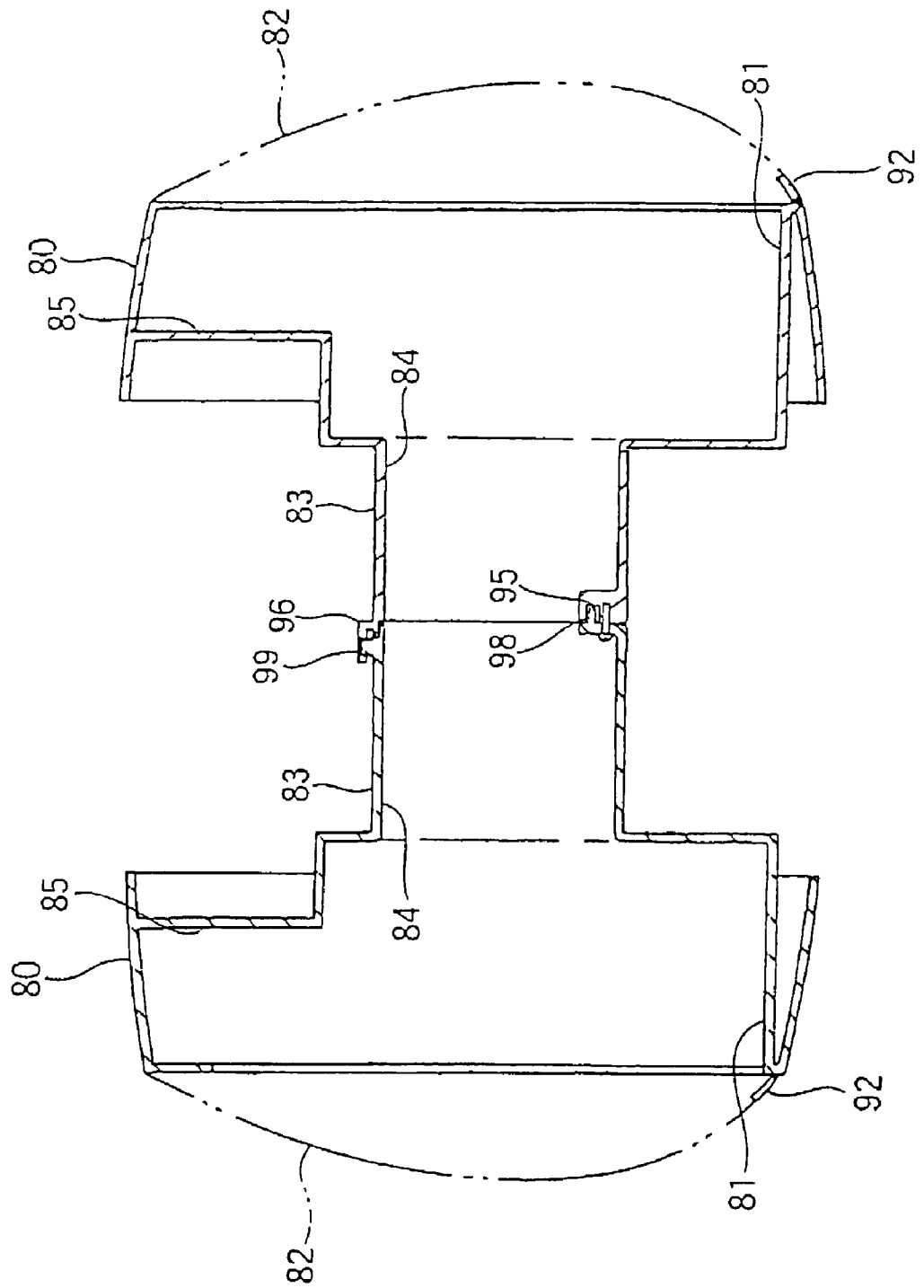
FIG. 7 is a vertical cross-sectional view showing a portion around a projection in FIG. 6.
Figure 8:
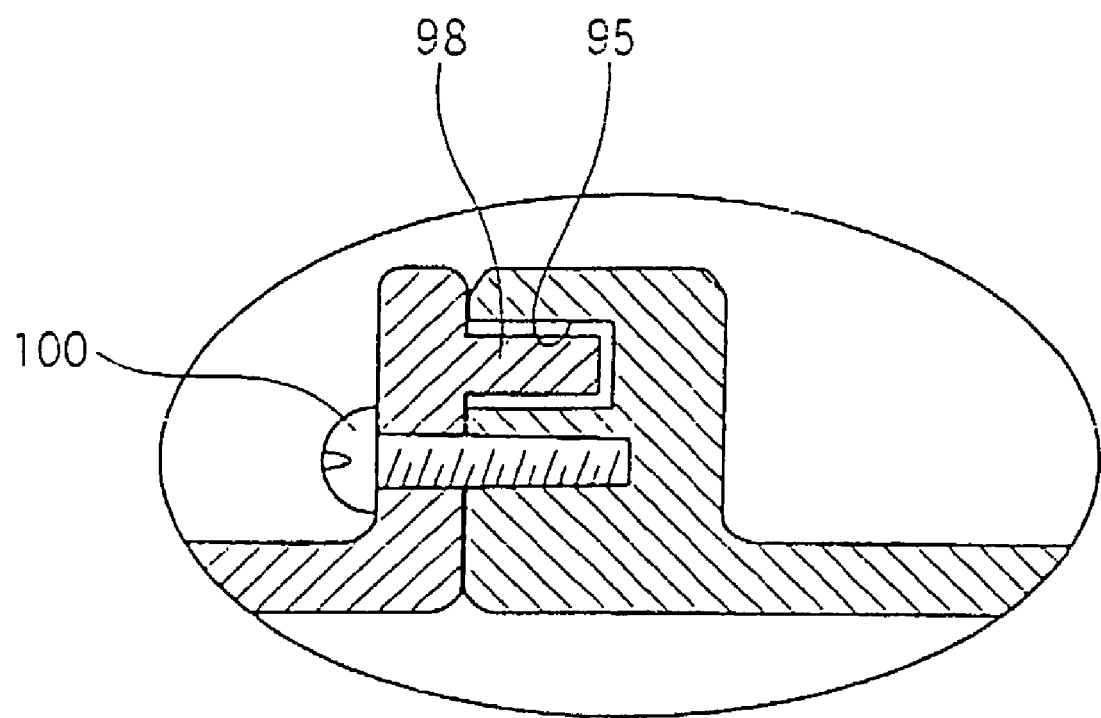
FIG. 8 is an enlarged view of a principal portion in FIG. 7.

As shown in FIG. 6 and FIG. 7, the both seat cowls 80, 80 are tightened by the bolt 100 (see FIG. 8) which is a tightening member for the both seat cowl side fitting portions 95, 98 of the left and right seat cowls 80, 80, the bolt holes 86, 86 used for attachment with respect to the seat rail 21 is tightened by bolts, and the rear combination lamp 41 is secured to the bolt holes 87, 87 for attaching the rear combination lamp 41 with bolts. The mud guard 42 is secured to the bolt holes 88, 88 for attaching the mud guard 42 by bolts, the bolt holes 89, 89 used for attachment with respect to the rear fender 23 are secured to the rear fender 23 with bolts, the bolt hole 90 for attaching the step holder 43 is secured to the step holder 43 with a bolt, and the bolt holes 91, 91 used for attachment with respect to the sub frame 25 side are secured to the sub frame 25 side with bolts. Then, peripheral components such as the tandem seat 22 or electric components (not shown) are mounted between or in the periphery of the both seat cowls 80, 80.

As shown in FIG. 7, since the both openings 84, 84 are connected in communication by the both seat cowls 80, 80 being combined on the rear fender 23, a laterally elongated storage space of the left and right storage boxes 81, 81 is created, so that long objects, such as a fishing rod, a stick, an umbrella can easily be stored.

In the left and right storage boxes 81, 81 structure as described above, since the left and right storage boxes 81, 81 are communicated with the projections 83, 83 provided in the left and right storage boxes 81, 81, an additional member for bringing them into communication is not necessary, and hence the number of components can be reduced. By combining the left and right storage boxes 81, 81 integrally, rigidity of the left and right seat cowls 80, 80, which define the left and right storage boxes 81, 81 is increased. In addition, since the vertical and lateral position of the left and right storage boxes 81, 81 can easily be aligned with each other, working efficiency in attaching the peripheral components can be improved without affecting the mounting accuracy of the peripheral components.

Also, in the storage box structure described above, rigidity is improved by the projections 83, 83 which combine the left and right storage boxes 81, 81 on the rear portion of the left and right storage boxes 81, 81 and hence the relatively heavy vehicle body components such as the rear combination lamp 41 can be directly mounted thereto. Therefore, an auxiliary member such as a stay for the vehicle body component can be eliminated, and hence reduction of the number of components and restraint of increase in weight are achieved. The points of attachment to the main frame 25 can be limited only to the front portion and the upper portion, and hence it is not necessary to provide the auxiliary member such as a stay for mounting the rear portion so as to extend from the vehicle body frame, whereby reduction of the number of components and restraint of increase in weight are achieved. In addition, since the projections 83, 83 are arranged so as to follow the upper portion of the rear fender 23 which extends rearward and downward, increase in height of the rear portion of the vehicle body is prevented, and increase in length of the vehicle body in the fore-and-aft direction is prevented, whereby design can be improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A storage box structure comprising:
    a pair of left and right seat cowls for covering sides of a vehicle body frame under a seat;
    storage boxes formed by the seat cowls so as to protrude outwardly in a direction of the vehicle width; and
    openable and closable lids that open and close toward outsides of a vehicle,
    wherein the storage boxes include projections projecting toward a center of the vehicle body, the projections include openings which are in communication with interiors of the storage boxes, one of the projections being fitted with the other projection, and the openings bringing the interiors of the left and right storage boxes into communication with each other.

2. The storage box structure according to claim 1, wherein the projections are arranged on rear portions of the storage boxes.

3. The storage box structure according to claim 1, wherein one of the projections is provided with a slot portion, and the other projection is provided with a projecting portion, so that the slot portion and the projecting portion are fitted to each other.

4. The storage box structure according to claim 2, wherein one of the projections is provided with a slot portion, and the other projection is provided with a projecting portion, so that the slot portion and the projecting portion are fitted to each other.

5. The storage box structure according to claim 1, wherein one of the projections is provided with a claw and the other projection is provided with a claw engaging portion, whereby engagement is achieved by fitting claw together with the claw engaging portion.

6. The storage box structure according to claim 5, wherein the claw and the claw engaging portion are provided on an upper portion of the respective projections, and lower portions of the respective projections are tightened by a tightening member.

7. The storage box structure according to claim 1, wherein each of the storage boxes includes a side plate on a side of the center of the vehicle body, the side plates being formed with bolt holes used for attachment with respect to a seat rail.

8. The storage box structure according to claim 1, wherein the projections are formed into substantially hexagonal column shapes, the projections being provided on rear sides of the storage boxes so as to extend from side plates toward the center of the vehicle body.

9. The storage box structure according to claim 1, wherein the projections are arranged so as to follow an upper portion of a rear fender which extends rearward and downward, thereby preventing an increase in height of a rear portion of the vehicle body, and preventing an increase in length of the vehicle body in the fore-and-aft direction.

10. The storage box structure according to claim 1, wherein a least one of the right and left storage boxes is provided with bolt holes for attaching a rear combination lamp with bolts.

11. A storage box structure comprising:
    a pair of left and right seat cowls for covering sides of a vehicle body frame under a seat;
    left and right storage boxes formed by the seat cowls so as to protrude outwardly in a direction of the vehicle width;
    lids on each of the storage boxes that open and close toward outsides of a vehicle; and projections on each of the left and right storage boxes projecting toward a longitudinal centerline of the vehicle body, wherein the projections include openings which are in communication with interiors of the storage boxes, one of the projections being fitted with the other projection, and the openings bringing the interiors of the left and right storage boxes into communication with each other, the projections communicating with each other in a location upward and rearward of a rear wheel.

12. The storage box structure according to claim 11, wherein the projections are arranged on rear portions of the storage boxes.

13. The storage box structure according to claim 11, wherein one of the projections is provided with a slot portion, and the other projection is provided with a projecting portion, so that the slot portion and the convex portion are fitted to each other.

14. The storage box structure according to claim 12, wherein one of the projections is provided with a concave portion, and the other projection is provided with a convex portion, so that the concave portion and the convex portion are fitted to each other.

15. The storage box structure according to claim 11, wherein one of the projections is provided with a claw and the other projection is provided with a claw engaging portion, whereby engagement is achieved by fitting claw together with the claw engaging portion.

16. The storage box structure according to claim 15, wherein the claw and the claw engaging portion are provided on an upper portion of the respective projections, and lower portions of the respective projections are tightened by a tightening member.

17. The storage box structure according to claim 11, wherein each of the storage boxes includes a side plate on a side of the center of the vehicle body, the side plates being formed with bolt holes used for attachment with respect to a seat rail.

18. The storage box structure according to claim 11, wherein the projections are formed into substantially hexagonal column shapes, the projections being provided on rear sides of the storage boxes so as to extend from side plates toward the center of the vehicle body.

19. The storage box structure according to claim 11, wherein the projections are arranged so as to follow an upper portion of the rear fender which extends rearward and downward, thereby preventing an increase in height of a rear portion of the vehicle body, and preventing an increase in length of the vehicle body in the fore-and-aft direction.

20. The storage box structure according to claim 11, wherein a least one of the right and left storage boxes is provided with bolt holes for attaching a rear combination lamp with bolts.

* * * * *